United States Patent [19]
Chubachi et al.

[11] Patent Number: 5,722,359
[45] Date of Patent: Mar. 3, 1998

[54] APPARATUS FOR CONTROLLING LEAN-BURN ENGINE

[75] Inventors: Katsuyoshi Chubachi; Yoshio Yamamoto, both of Wako, Japan

[73] Assignee: Honda Giken Kogyo Kabushiki Kaisha, Tokyo, Japan

[21] Appl. No.: 783,301

[22] Filed: Jan. 10, 1997

[30] Foreign Application Priority Data

Jan. 12, 1996 [JP] Japan ................... 8-004164

[51] Int. Cl.$^6$ ................... F02B 75/06
[52] U.S. Cl. ................... 123/192.2
[58] Field of Search ................... 123/192.2, 192.1

[56] References Cited

U.S. PATENT DOCUMENTS

| | | | |
|---|---|---|---|
| 4,982,707 | 1/1991 | Maeda et al. | 123/192.2 |
| 5,056,487 | 10/1991 | Yamakado et al. | 123/192.2 |
| 5,087,869 | 2/1992 | Kuriyama et al. | 123/192.2 |
| 5,415,139 | 5/1995 | Aoto et al. | 123/192.1 |

*Primary Examiner*—Noah P. Kamen
*Attorney, Agent, or Firm*—Nikaido, Marmelstein, Murray & Oram LLP

[57] ABSTRACT

An apparatus for controlling a motor vehicle equipped with a lean-burn engine and an electric motor coupled to an output shaft of the lean-burn engine has an engine controller, a combustion-pressure variation detector, and a motor controller. The engine controller controls the lean-burn engine to operate in a lean range of air-fuel ratios. The combustion-pressure variation detector detects a variation in a combustion pressure of the lean-burn engine controlled by the engine controller. The motor controller controls the electric motor to apply a force to the output shaft of the lean-burn engine for suppressing a variation caused in a torque produced by the lean-burn engine based on the variation in the combustion pressure as detected by the combustion-pressure variation detector means if the variation in the combustion pressure is in excess of a predetermined value.

12 Claims, 4 Drawing Sheets

APPARATUS FOR CONTROLLING LEAN-BURN ENGINE

BACKGROUND OF THE INVENTION

1. Field of the Invention

The present invention relates to an apparatus for controlling a motor vehicle equipped with a lean-burn engine and an electric motor connected to the lean-burn engine.

2. Description of the Related Art

Known hybrid vehicles are equipped with an electric motor connected to the crankshaft (output shaft) of an internal combustion engine. In operation, the engine is started by the electric motor. While the engine is operating, the electric motor is operated as an electric generator by the engine. Electric energy generated by the electric motor is supplied to charge a battery mounted on the hybrid vehicle or to energize various electronic devices mounted on the hybrid vehicle.

Many automobiles are now powered by a lean-burn engine capable of achieving good mileage for the purposes of protection of natural resources and environments. It is desirable that such a lean-burn engine be installed on the hybrid vehicles.

On automobiles equipped with a lean-burn engine, it has heretofore been customary to control the lean-burn engine to operate in a lean range in which the air-fuel ratio is relatively high and the air-fuel mixture is air-rich. Depending on the load on the engine and various factors, the lean-burn engine often operates beyond the lean range in which it can operate stably, causing the actual air-fuel ratio to be shifted into an excessively air-rich region. When the lean-burn engine operates beyond the lean range, the combustion pressure in the engine tends to vary greatly, resulting in changes in the torque produced by the engine.

According to a conventional control process, when the air-fuel ratio of a lean-burn engine exceeds a lean limit and the combustion pressure in the engine varies beyond a certain level, the air-fuel ratio is forcibly lowered below the lean range, i.e., the air-fuel mixture is controlled so as to be fuel-rich, for thereby preventing the torque produced by the engine from unduly changing. Thereafter, the air-fuel ratio is gradually increased back into the lean range.

The above conventional control process, however, is disadvantageous in that since the lean-burn engine which achieves good mileage in the air-rich lean range is controlled to operate, even temporarily, on a low air-fuel ratio, i.e., in a fuel-rich range, the performance of the lean-burn engine for low fuel combustion cannot fully be accomplished.

In view of the above background, the inventor of the present invention has made various studies and found out that the foregoing drawbacks can be eliminated on a hybrid vehicle on which an engine is connected to an electric motor.

SUMMARY OF THE INVENTION

It is therefore an object of the present invention to provide an apparatus for controlling a motor vehicle equipped with a lean-burn engine and an electric motor connected to the lean-burn engine to operate the lean-burn engine in a lean range for achieving good mileage as much as possible while suppressing variations in the torque produced by the lean-burn engine.

To achieve the above object, there is provided in accordance with the present invention an apparatus for controlling a motor vehicle equipped with a lean-burn engine and an electric motor coupled to an output shaft of the lean-burn engine, comprising engine control means for controlling the lean-burn engine to operate in a lean range of air-fuel ratios, combustion-pressure variation detecting means for detecting a variation in a combustion pressure of the lean-burn engine controlled by said engine control means, and motor control means for controlling the electric motor to apply a force to the output shaft of the lean-burn engine for suppressing a variation caused in a torque produced by the lean-burn engine based on the variation in the combustion pressure as detected by said combustion-pressure variation detecting means if said variation in the combustion pressure is in excess of a predetermined value.

When said variation in the combustion pressure of the lean-burn engine as detected by the combustion-pressure variation detecting means is in excess of the predetermined value, tending to vary the torque produced by the lean-burn engine, the motor control means controls the electric motor to apply a force to the output shaft of the lean-burn engine for suppressing a variation in the torque produced by the lean-burn engine, thus suppressing such a torque variation. Therefore, the engine control means may control the lean-burn engine in the lean range at all times.

Therefore, it is possible to operate the lean-burn engine in the lean range for achieving good mileage as much as possible while suppressing variations in the torque produced by the lean-burn engine.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
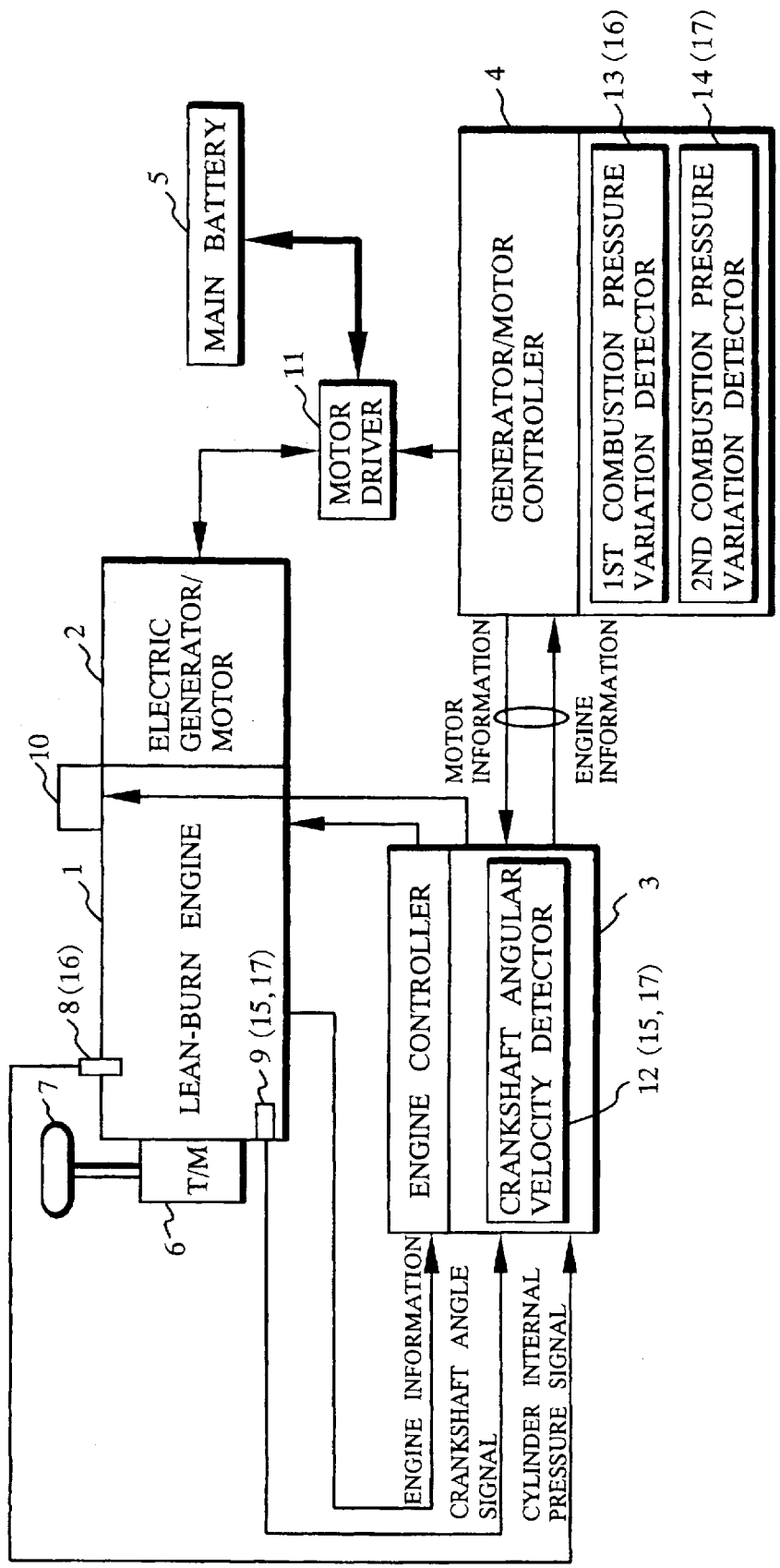
FIG. 1 is a block diagram of a vehicle powered by a lean-burn engine and controlled by a control apparatus according to an embodiment of the present invention.

As shown in FIG. 1, a vehicle powered by a lean-burn engine and controlled by a control apparatus according to an embodiment of the present invention comprises a hybrid vehicle, for example, which has a lean-burn engine 1, an electric generator/motor 2 connected to the crankshaft (output shaft) of the lean-burn engine 1, an engine controller 3 (engine control means) for controlling the lean-burn engine 1, a generator/motor controller 4 (motor control means) for controlling the electric generator/motor 2, and a main battery 5 serving as a power supply for various electronic devices (not shown) installed on the hybrid vehicle. The engine controller 3 and the generator/motor controller 4 are implemented by a microcomputer or the like.

The crankshaft of the lean-burn engine 1 is operatively coupled to drive wheels 7 of the hybrid vehicle through a transmission 6, for rotating the drive wheels 7 through the transmission 6. The lean-burn engine 1 is associated with a pressure sensor 8 for detecting an internal pressure in the engine cylinders and a crankshaft angle sensor 9 for detecting an angular displacement of the crankshaft of the lean-burn engine 1. Detected signals from these sensors 8, 9 are supplied to the engine controller 3.

The lean-burn engine 1 is associated with other sensors including a coolant temperature sensor, an engine speed sensor, an air-fuel ratio sensor, etc. for detecting various states of the lean-burn engine 1. Detected signals from these sensors are also supplied as engine information to the engine controller 3.

A spool valve 10 is mounted on the lean-burn engine 1 for varying the timing of operation of intake and exhaust valves of the lean-burn engine 1.

The electric generator/motor 2 can operate as either an electric generator or an electric motor. The electric generator/motor 2 is connected to the main battery 5 through a motor driver 11 which is controlled by the generator/motor controller 4. When the generator/motor controller 4 operates as an electric motor, it is energized by the main battery 5 through the motor driver 11. When the generator/motor controller 4 operates as an electric generator, it supplies generated electric energy through the motor driver 11 to the main battery 5.

While the lean-burn engine 1 is in operation, the engine controller 3, which is implemented by a microcomputer or the like, controls the rate of supply of fuel to the lean-burn engine 1 and the timing of operation of intake and exhaust valves based on the engine information supplied from the sensors in order to operate the lean-burn engine 1 in an air-rich lean range.

The engine controller 3 has, as a functional block, a crankshaft angular velocity detector 12 for recognizing the crankshaft angular velocity of the lean-burn engine 1 based on the detected signal from the crankshaft angle sensor 9.

The engine controller 3 outputs data of the internal pressure in the engine cylinders as detected by the pressure sensor 8 and data of the crankshaft angle as detected by the crankshaft angle detector 12, as engine information to the generator/motor controller 4.

When the lean-burn engine 1 is started, the generator/motor controller 4, which is also implemented by a microcomputer or the like, controls the electric generator/motor 2 through the motor driver 11 to operate the electric generator/motor 2 as an electric motor for starting the lean-burn engine 1. When the lean-burn engine 1 is in operation, the generator/motor controller 4 controls the electric generator/motor 2 through the motor driver 11 to operate the electric generator/motor 2 as an electric generator for generating electric energy.

The generator/motor controller 4 has, as functional blocks, a first combustion pressure variation detector 13 for recognizing a variation in the combustion pressure of the lean-burn engine 1, i.e., a variation in the combustion pressure from a reference combustion pressure corresponding to the rotational speed of the lean-burn engine 1, based on the internal pressure in the engine cylinders as detected by the pressure sensor 8, and a second combustion pressure variation detector 14 for recognizing a variation in the crankshaft angular velocity, i.e., a variation in the crankshaft angular velocity from a reference crankshaft angular velocity corresponding to the rotational speed of the lean-burn engine 1, based on the data of the crankshaft angular velocity as recognized by the crankshaft angular velocity detector 12, as a variation in the combustion pressure of the lean-burn engine 1. If the percentage of the variation in the combustion pressure as recognized by the first combustion pressure variation detector 13 or the variation in the crankshaft angular velocity as recognized by the second combustion pressure variation detector 14, i.e., the proportion of the variation from the reference combustion pressure or the reference crankshaft angular velocity, exceeds a predetermined value, then the generator/motor controller 4 controls the electric generator/motor 2 to suppress a variation in the torque produced by the lean-burn engine 1.

The generator/motor controller 4 outputs motor information indicative of an operating state of the electric generator/motor 2 which it controls to the engine controller 3.

The crankshaft angle sensor 9 and the crankshaft angular velocity detector 12 jointly serve as a crankshaft angular velocity detecting means 15. The pressure sensor 8 and the first combustion pressure variation detector 13 jointly serve as a combustion pressure variation detecting means 16, and the crankshaft angle sensor 9, the crankshaft angular velocity detector 12, and the second combustion pressure variation detector 14 jointly serve as a combustion pressure variation detecting means 17.

Operation of the hybrid vehicle shown in FIG. 1 will be described below.

Figure 2:
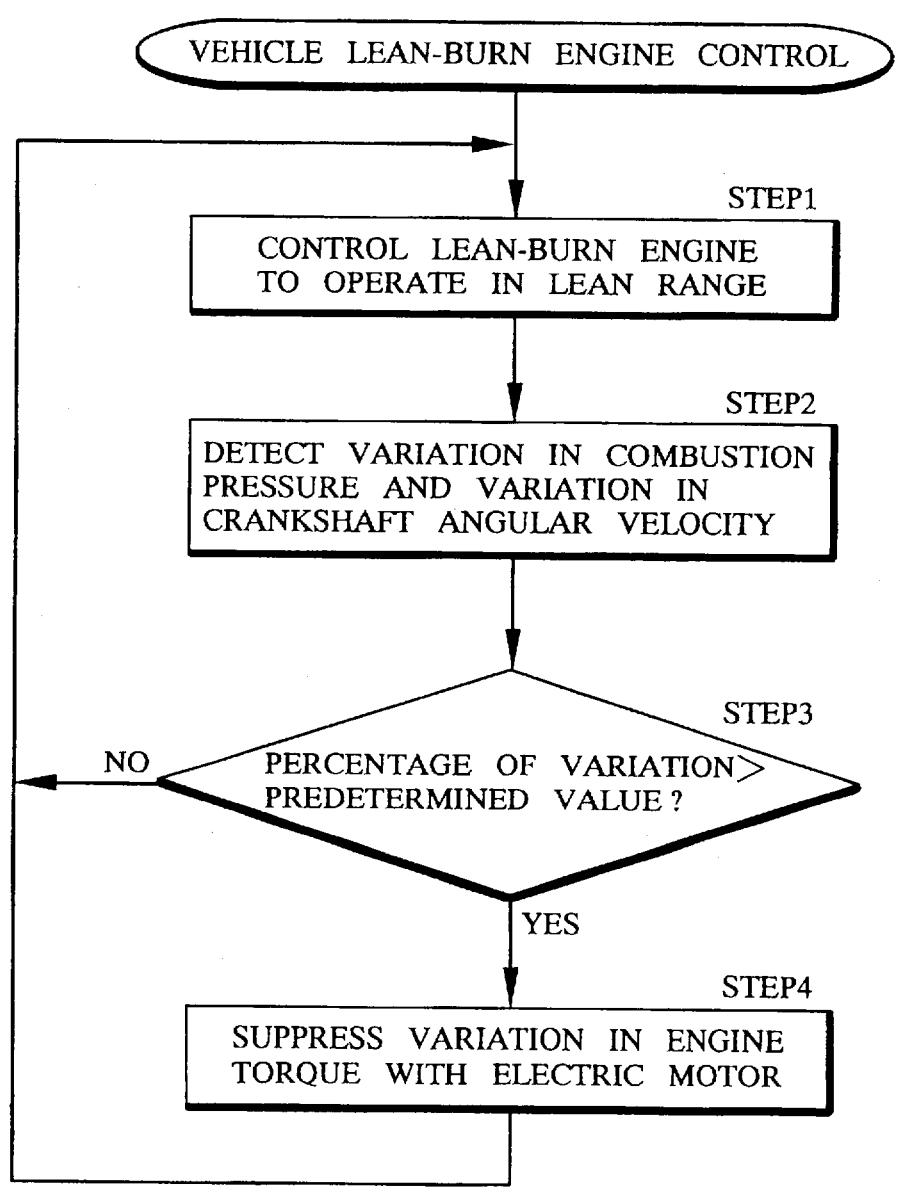
FIG. 2 is a flowchart of an operation sequence of the control apparatus.

For propelling the hybrid vehicle, the generator/motor controller 4 controls the electric generator/motor 2 to operate as a starting motor with electric energy supplied from the main battery 5 for thereby rotating the crankshaft of the lean-burn engine 1. At the same time, the engine controller 3 supplies fuel to the lean-burn engine 1 to start the lean-burn engine 1. After the lean-burn engine 1 has started, the engine controller 3 and the generator/motor controller 4 carries out a control sequence as shown in FIG. 2.

The engine controller 3 controls the lean-burn engine 1 to operate in a lean range of air-fuel ratios in STEP 1. The first and second combustion pressure variation detectors 13, 14 of the generator/motor controller 4 recognize, respectively, a variation in the combustion pressure and a variation in the crankshaft angular velocity based on the detected data from the pressure sensor 8 and the detected data from the crankshaft angular velocity detector 12 in STEP 2, and compare the percentages of the recognized variations with respective predetermined values in STEP 3.

Figure 3:
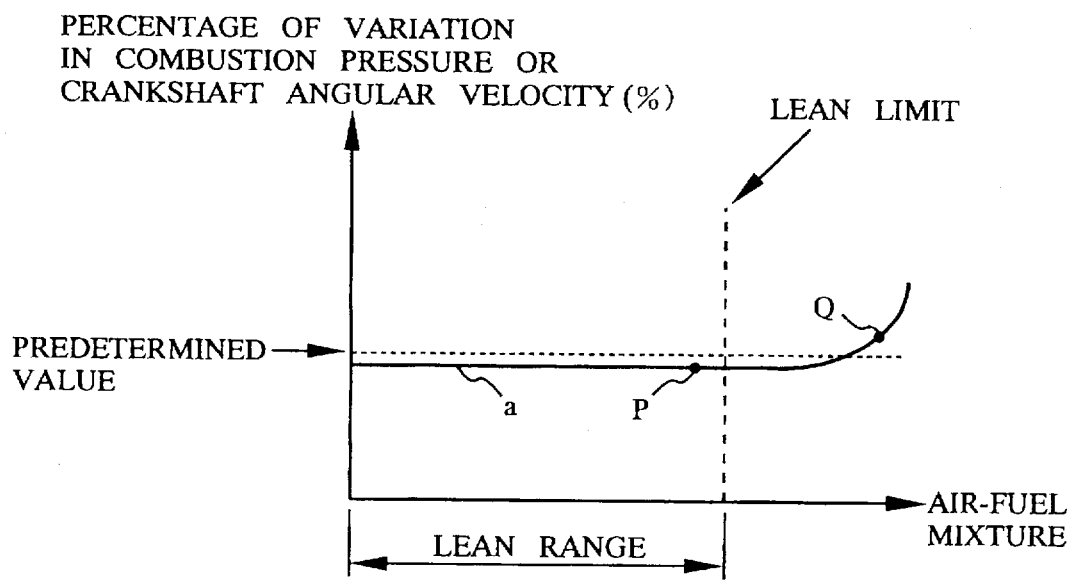
FIG. 3 is a diagram illustrative of operation of the control apparatus.

Since the lean-burn engine 1 is controlled to operate in the lean range by the engine controller 3, it operates with an air-fuel ratio in the lean range as indicated at a point P, for example, in FIG. 3. At this time, the percentage of a variation in the combustion pressure or the crankshaft angular velocity of the lean-burn engine 1 is of a substantially constant, small level as indicated by the solid-line curve "a" in FIG. 3, which is smaller than the predetermined value. In this case ("NO" in STEP 3), control returns to STEP 1. The generator/motor controller 4 controls the motor driver 11 to operate the electric generator/motor 2 as an electric generator for generating an amount of electric energy commensurate with the output power of the lean-burn engine 1, and supplies the generated electric energy to charge the main battery 5.

Depending on running conditions of the hybrid vehicle, the air-fuel ratio of the lean-burn engine 1 may temporarily exceed an upper limit (lean limit) of the lean range and reach a point Q, for example, in FIG. 3 where the air-fuel mixture is excessively air-rich. At this time, the percentage of a variation in the combustion pressure or the crankshaft angular velocity of the lean-burn engine 1 is greater than the predetermined value as indicated by the solid-line curve "a" in FIG. 3. Therefore, the lean-burn engine 1 tends to cause torque variations due to the variation in the combustion pressure.

In this case ("YES" in STEP 3), the generator/motor controller 4 controls the electric generator/motor 2 coupled to the crankshaft of the lean-burn engine 1 to produce forces tending to suppress the torque variations due to the variation in the combustion pressure, depending on the variation in the combustion pressure or the variation in the crankshaft angular velocity in STEP 4.

Specifically, if the combustion pressure or the crankshaft angular velocity of the lean-burn engine 1 increases from the reference combustion pressure or the reference crankshaft angular velocity which corresponds to the rotational speed of the lean-burn engine 1, then the generator/motor controller 4 controls the electric generator/motor 2 to produce forces depending on the variation in the combustion pressure or the corresponding variation in the crankshaft angular velocity for thereby reducing the torque produced by the lean-burn engine 1, stated otherwise, to apply a load depending on the variation in the combustion pressure or the variation in the crankshaft angular velocity to the lean-burn engine 1. For example, the generator/motor controller 4 controls the electric generator/motor 2 to operate as an electric motor rotating in a direction opposite to the direction of rotation of the lean-burn engine 1 while controlling the forces produced by the electric generator/motor 2 depending on the variation in the combustion pressure or the variation in the crankshaft angular velocity. If the generator/motor controller 4 is controlling the electric generator/motor 2 to operate as an electric generator, then the generator/motor controller 4 may increase the amount of generated electric energy depending on the variation in the combustion pressure or the variation in the crankshaft angular velocity for thereby increasing the load on the lean-burn engine 1.

Conversely, if the combustion pressure or the crankshaft angular velocity of the lean-burn engine 1 decreases from the reference combustion pressure or the reference crankshaft angular velocity which corresponds to the rotational speed of the lean-burn engine 1, then the generator/motor controller 4 controls the electric generator/motor 2 to produce forces depending on the variation in the combustion pressure or the corresponding variation in the crankshaft angular velocity for thereby increasing the torque produced by the lean-burn engine 1, stated otherwise, to apply an assistive force depending on the variation in the combustion pressure or the variation in the crankshaft angular velocity to the lean-burn engine 1. For example, the generator/motor controller 4 controls the electric generator/motor 2 to operate as an electric motor rotating in the same direction as the direction of rotation of the lean-burn engine 1 while controlling the forces produced by the electric generator/motor 2 depending on the variation in the combustion pressure or the variation in the crankshaft angular velocity. If the generator/motor controller 4 is controlling the electric generator/motor 2 to operate as an electric generator, then the generator/motor controller 4 may decrease the amount of generated electric energy depending on the variation in the combustion pressure or the variation in the crankshaft angular velocity for thereby reducing the load on the lean-burn engine 1.

When the air-fuel ratio of the lean-burn engine 1 returns to the lean range and the variation in the combustion pressure or the variation in the crankshaft angular velocity becomes lower than the predetermined value, then the above process of controlling the electric generator/motor 2 is canceled.

Figure 4:
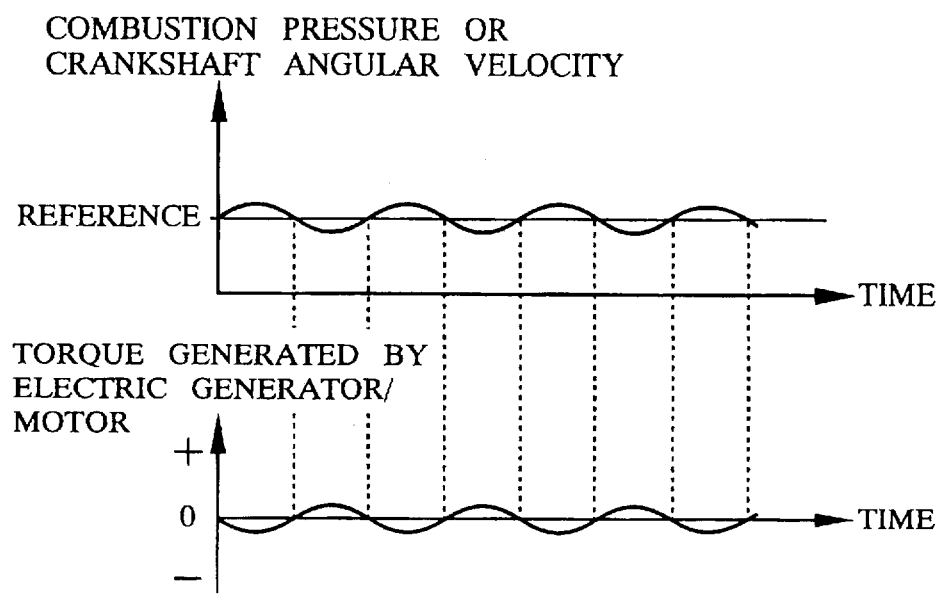
FIG. 4 is a diagram illustrative of operation of the control apparatus.

When the combustion pressure or the crankshaft angular velocity varies with respect to the reference combustion pressure or the reference crankshaft angular velocity as shown in an upper section of FIG. 4, the torque produced by the lean-burn engine 1 tends to vary in synchronism with the combustion pressure or the crankshaft angular velocity. However, the electric generator/motor 2 generates and applies a torque which is opposite phase with the combustion pressure or the crankshaft angular velocity to the crankshaft of the lean-burn engine 1 as shown in a lower section of FIG. 4. Consequently, the variation in the engine torque produced due to the variation in the combustion pressure or the crankshaft angular velocity is canceled out by the torque generated by the electric generator/motor 2. The torque produced by the lean-burn engine 1 is thus prevented from being unduly varied.

Even if the air-fuel ratio of the lean-burn engine 1 exceeds the lean limit and reaches an excessively air-rich level, therefore, the engine controller 3 does not forcibly control the air-fuel ratio to becomes fuel-rich, but controls the lean-burn engine 1 to keep its air-fuel ratio in the lean range at all times. The lean-burn engine 1 operates with its air-fuel ratio kept in the lean range at all times except for temporarily becoming excessively air-rich due to running conditions of the hybrid vehicle. The lean-burn engine 1 thus operates for good mileage, and the performance of the lean-burn engine 1 for low fuel combustion can fully be accomplished.

As described above, the lean-burn engine 1 is controlled to operate in the lean range for good mileage as much as possible while suppressing variations in the torque produced by the lean-burn engine 1.

Figure 5:
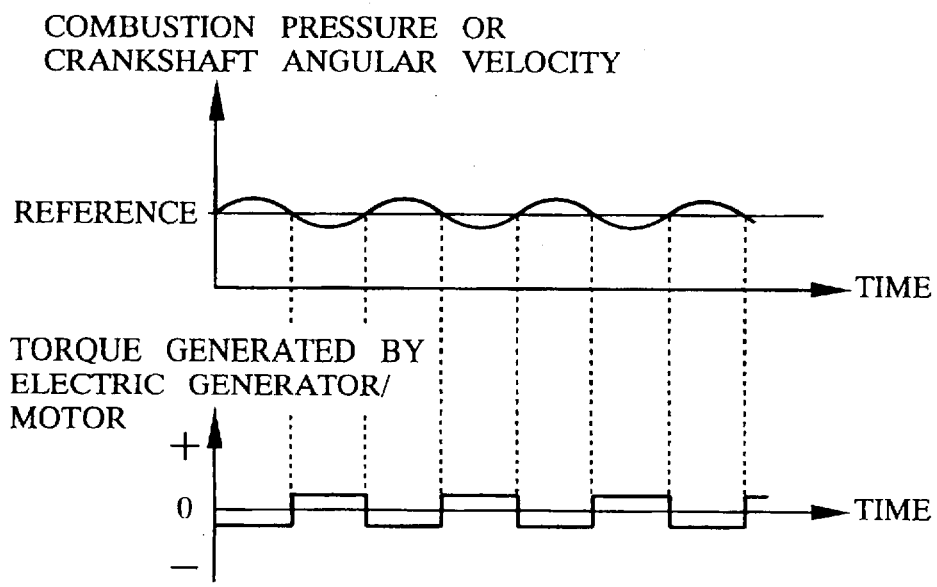
FIG. 5 is a diagram illustrative of operation of a control apparatus according to another embodiment of the present invention.

In the above embodiment, the electric generator/motor 2 is controlled to generate a force depending on and kept in opposite phase with the variation in the combustion pressure or the variation in the crankshaft angular velocity for thereby suppressing variations in the torque produced by the lean-burn engine 1. However, if the combustion pressure or the crankshaft angular velocity of the lean-burn engine 1 increases from the reference combustion pressure or the reference crankshaft angular velocity, then the electric generator/motor 2 may be controlled to produce a predetermined constant torque (load) for reducing the torque generated by the lean-burn engine 1, and if the combustion pressure or the crankshaft angular velocity of the lean-burn engine 1 decreases from the reference combustion pressure or the reference crankshaft angular velocity, then the electric generator/motor 2 may be controlled to produce a predetermined constant torque (assistive force) for increasing the torque generated by the lean-burn engine 1, as shown in a lower section of FIG. 5. Such an alternative control process shown in FIG. 5 is also effective to suppress a variation in the torque caused by a variation in the combustion pressure of the lean-burn engine 1 while controlling the lean-burn engine 1 to operate in the lean range with the engine controller 3.

In the illustrated embodiment, both a variation in the combustion pressure of the lean-burn engine 1 and a variation in the crankshaft angular velocity are detected, and the electric generator/motor 2 is controlled to suppress a variation in the torque generated by the lean-burn engine 1 if the percentage of either one of the detected variations exceeds the predetermined value. However, either one of a variation in the combustion pressure of the lean-burn engine 1 and a variation in the crankshaft angular velocity may be detected, and the electric generator/motor 2 may be controlled to suppress a variation in the torque generated by the lean-burn engine 1 if the percentage of the detected variation exceeds the predetermined value.

While the present invention has been illustrated as being applied to the hybrid vehicle, the principles of the present invention are also applicable to a vehicle which has an electric motor, controllable as described above, for starting an engine.

Although certain preferred embodiments of the present invention have been shown and described in detail, it should be understood that various changes and modifications may be made therein without departing from the scope of the appended claims.

What is claimed is:

1. An apparatus for controlling a motor vehicle equipped with a lean-burn engine and an electric motor coupled to an output shaft of the lean-burn engine, comprising:

engine control means for controlling the lean-burn engine to operate in a lean operating range of air-fuel ratios;

combustion-pressure variation detecting means for detecting a variation in a combustion pressure of the lean-burn engine controlled by said engine control means, wherein said variation indicates whether the lean-burn engine has exceeded said lean operating range; and motor control means for controlling the electric motor to apply a force to the output shaft of the lean-burn engine for suppressing a variation caused in a torque produced by the lean-burn engine based on a real time variation in the combustion-pressure as detected by said combustion-pressure variation detecting means if said variation in the combustion-pressure is in excess of a predetermined value indicating that said lean operating range has been exceeded, wherein said motor control means comprises means for controlling said electric motor to supply a positive torque when a real-time detected combustion pressure is below a predetermined reference value and to supply a negative torque when said real-time detected combustion-pressure is above a predetermined reference value, to therein return said engine to said lean operating range.

2. An apparatus according to claim 1, wherein said combustion-pressure variation detecting means comprises a pressure sensor for detecting an internal pressure in a cylinder of the lean-burn engine, and means for detecting the variation in the combustion pressure of the lean-burn engine based on a detected signal from said pressure sensor.

3. An apparatus according to claim 1, wherein said combustion-pressure variation detecting means comprises crankshaft angular velocity detecting means for detecting a crankshaft angular velocity of the lean-burn engine, and means for recognizing the crankshaft angular velocity as detected by said crankshaft angular velocity detecting means as a quantity indicative of the variation in the combustion pressure of the lean-burn engine.

4. An apparatus according to claim 1, wherein said combustion-pressure variation detecting means comprises a pressure sensor for detecting an internal pressure in a cylinder of the lean-burn engine, first combustion-pressure variation detecting means for detecting the variation in the combustion pressure of the lean-burn engine based on a detected signal from said pressure sensor, crankshaft angular velocity detecting means for detecting a crankshaft angular velocity of the lean-burn engine, and second combustion-pressure variation detecting means for recognizing the crankshaft angular velocity as detected by said crankshaft angular velocity detecting means as a quantity indicative of the variation in the combustion pressure of the lean-burn engine, and wherein said motor control means comprises means for controlling the electric motor to apply the force to the output shaft of the lean-burn engine for suppressing the variation caused in the torque produced by the lean-burn engine based on the variation in the combustion pressure if the variation in the combustion pressure as detected by either one of the first and second combustion-pressure variation detecting means is in excess of said predetermined value.

5. An apparatus according to claim 1, wherein said motor control means comprises means for controlling said electric motor to generate opposite forces having respective magnitudes depending on the variation in the combustion pressure and tending to reduce and increase, respectively, the torque produced by the lean-burn engine if the variation in the combustion pressure as detected by said combustion-pressure variation detecting means occurs as an increase and a decrease, respectively, in the combustion pressure.

6. An apparatus according to claim 1, wherein said motor control means comprises means for controlling said electric motor to generate opposite forces having respective predetermined magnitudes and tending to reduce and increase, respectively, the torque produced by the lean-burn engine if the variation in the combustion pressure as detected by said combustion-pressure variation detecting means occurs as an increase and a decrease, respectively, in the combustion pressure.

7. An apparatus for controlling a motor vehicle equipped with a lean-burn engine and an electric motor coupled to an output shaft of the lean-burn engine, comprising:

engine control means for controlling the lean-burn engine to operate in a lean operating range of air-fuel ratios;

combustion-pressure variation detecting means for detecting a variation in a combustion pressure of the lean-burn engine controlled by said engine control means, wherein said variation indicates whether the lean-burn engine has exceeded said lean operating range; and motor control means for controlling the electric motor to apply a force to the output shaft of the lean-burn engine for suppressing a variation caused in a torque produced by the lean-burn engine based on a real-time variation in the combustion-pressure as detected by said combustion-pressure variation detecting means if said variation in the combustion-pressure is in excess of a predetermined value indicating that said lean operating range has been exceeded, wherein said motor control means comprises means for controlling said electric motor to supply a positive torque when a real-time detected crankshaft angular velocity is below a predetermined reference value and to supply a negative torque when said real-time detected crankshaft angular velocity is above a predetermined reference value, to therein return said engine to said lean operating range.

8. An apparatus according to claim 7, wherein said combustion-pressure variation detecting means comprises a pressure sensor for detecting an internal pressure in a cylinder of the lean-burn engine, and means for detecting the variation in the combustion pressure of the lean-burn engine based on a detected signal from said pressure sensor.

9. An apparatus according to claim 7, wherein said combustion-pressure variation detecting means comprises crankshaft angular velocity detecting means for detecting a crankshaft angular velocity of the lean-burn engine, and means for recognizing the crankshaft angular velocity as detected by said crankshaft angular velocity detecting means as a quantity indicative of the variation in the combustion pressure of the lean-burn engine.

10. An apparatus according to claim 7, wherein said combustion-pressure variation detecting means comprises a pressure sensor for detecting an internal pressure in a cylinder of the lean-burn engine, first combustion-pressure variation detecting means for detecting the variation in the combustion pressure of the lean-burn engine based on a detected signal from said pressure sensor, crankshaft angular velocity detecting means for detecting a crankshaft angular velocity of the lean-burn engine, and second combustion-pressure variation detecting means for recognizing the crankshaft angular velocity as detected by said crankshaft angular velocity detecting means as a quantity indicative of the variation in the combustion pressure of the lean-burn engine, and wherein said motor control means comprises means for controlling the electric motor to apply the force to the output shaft of the lean-burn engine for suppressing the variation caused in the torque produced by the lean-burn engine based on the variation in the combustion pressure if the variation in the combustion pressure as detected by either one of the first and second combustion-pressure variation detecting means is in excess of said predetermined value.

11. An apparatus according to claim 7, wherein said motor control means comprises means for controlling said electric motor to generate opposite forces having respective magnitudes depending on the variation in the combustion pressure and tending to reduce and increase, respectively, the torque produced by the lean-burn engine if the variation in the combustion pressure as detected by said combustion-pressure variation detecting means occurs as an increase and a decrease, respectively, in the combustion pressure.

12. An apparatus according to claim 7, wherein said motor control means comprises means for controlling said electric motor to generate opposite forces having respective predetermined magnitudes and tending to reduce and increase, respectively, the torque produced by the lean-burn engine if the variation in the combustion pressure as detected by said combustion-pressure variation detecting means occurs as an increase and a decrease, respectively, in the combustion pressure.

\* \* \* \* \*